(12) United States Patent
Sun et al.

(10) Patent No.: US 8,774,320 B2
(45) Date of Patent: Jul. 8, 2014

(54) METHOD, SYSTEM, AND APPARATUS FOR CARRIER SYNCHRONIZATION OF QAM MODULATED SIGNALS

(76) Inventors: Han Henry Sun, Ottawa (CA); Kuang-Tsan Wu, Kanata (CA)

(*) Notice: Subject to any disclaimer, the term of this patent is extended or adjusted under 35 U.S.C. 154(b) by 325 days.

(21) Appl. No.: 12/824,490

(22) Filed: Jun. 28, 2010

(65) Prior Publication Data
US 2011/0318017 A1 Dec. 29, 2011

(51) Int. Cl.
*H04L 27/00* (2006.01)
(52) U.S. Cl.
USPC .................................................. 375/324
(58) Field of Classification Search
USPC .......................... 375/322, 324, 271
See application file for complete search history.

(56) References Cited

U.S. PATENT DOCUMENTS

| 2009/0316828 A1* | 12/2009 | Qu ....................... 375/298 |
| 2011/0150503 A1* | 6/2011 | Winzer ................... 398/202 |

OTHER PUBLICATIONS

A.J.Viterbi, A.M.Viterbi, "Nonlinear Estimation of PSK-Modulated Carrier Phase with Application to Burst Digital Transmission", IEEE Trans. Information Theory, vol. IT-29, No. 4, Jul. 1983, pp. 543-551.
K. Roberts, et al, "Performance of dual-polarization QPSK for optical transport systems," JLT, vol. 27, No. 16, pp. 3546-3559, Aug. 2009.
Ezra Ip, Joseph Kahn, "Carrier Synchronization for 3- and 4-bit-per-Symbol Optical Transmission", J. Lightwave Tech., vol. 23, No. 12, Dec. 2005, pp. 4110-4124.
Ezra Ip, et al., "Feedforward Carrier Recovery for Coherent Optical Communications," Journal of Lightwave Technology, vol. 25, No. 9, Sep. 2007, pp. 2675-2692.
Michael G. Taylor, "Coherent Detection Method Using DSP for Demodulation of Signal and Subsequent Equalization of Propagation Impairments," IEEE Photonics Technology Letters, vol. 16, No. 2, Feb. 2004, pp. 674-676.
S.J. Savory, et al, "Digital equalisation of 40Gbit/s per wavelength transmission over 2480 km of standard fibre without optical dispersion compensation," ECOC 2006, paper Th2.5.5.
H. Sun, et al, "Real-time measurements of a 40 Gb/s coherent system," Opt. Express 16, 2008, pp. 873-879.
J. Proakis, "Digital Communications", 2nd Edition, 1983, pp. 163-172, 278-285, 313-318.

* cited by examiner

*Primary Examiner* — Kevin Kim
(74) *Attorney, Agent, or Firm* — David L. Soltz

(57) ABSTRACT

Consistent with the present disclosure, optical signals are modulated in accordance with a higher order QAM modulation format, such as 8-QAM, to carry customer data, for example. The optical signals are converted to corresponding electrical signals, which are then subject to further processing. In particular, phase data associated with the higher order QAM constellation is processed, such that the outer points of the constellation are rotated to have the same phase as the inner points. As a result, both the inner and outer points resemble a constellation, and both may be more readily processed using feedforward or feedback carrier recovery. After such carrier recovery, the phase data is further processed so that the outer points are rotated back and the customer data can be extracted from the phase data.

23 Claims, 16 Drawing Sheets

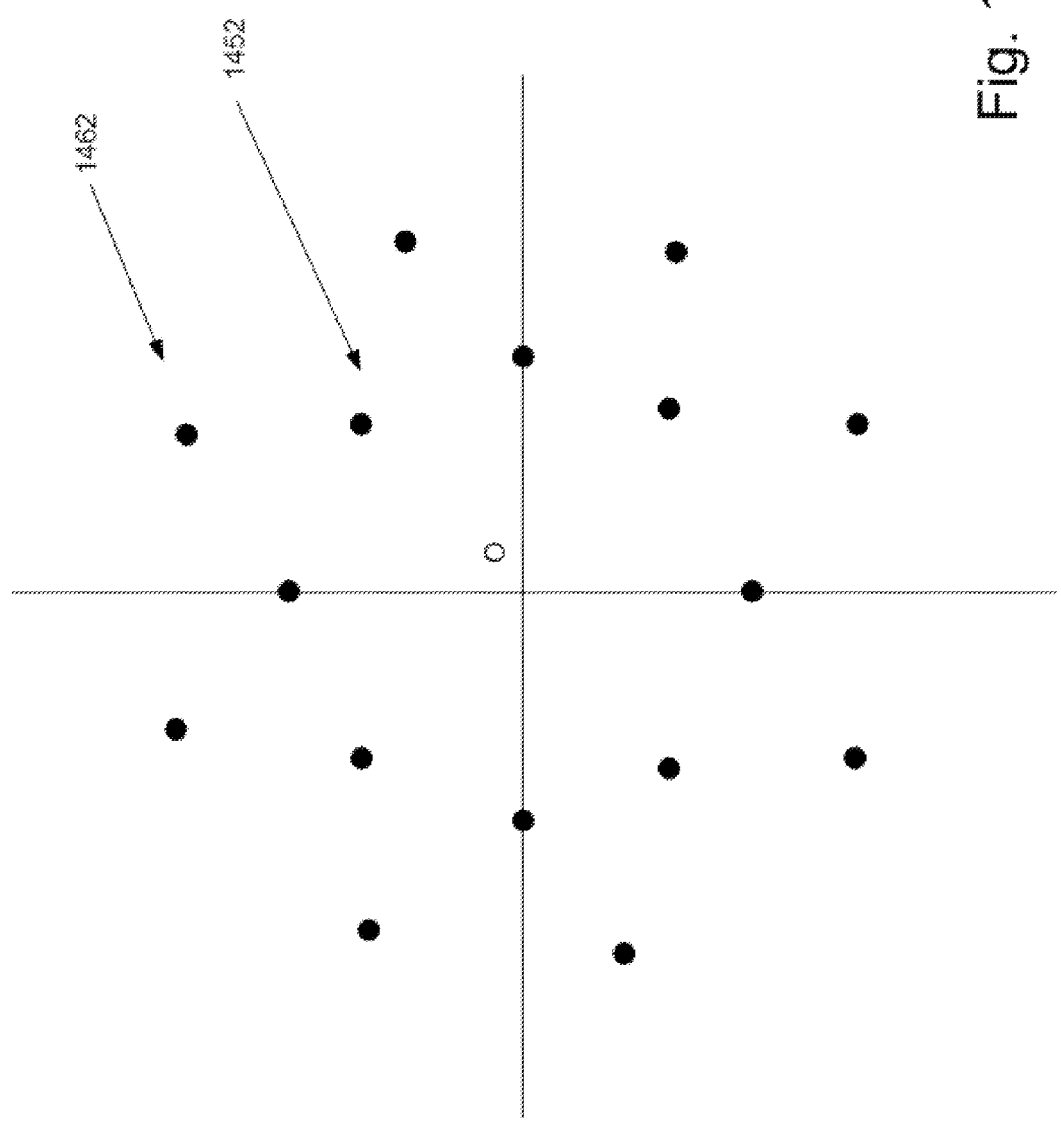

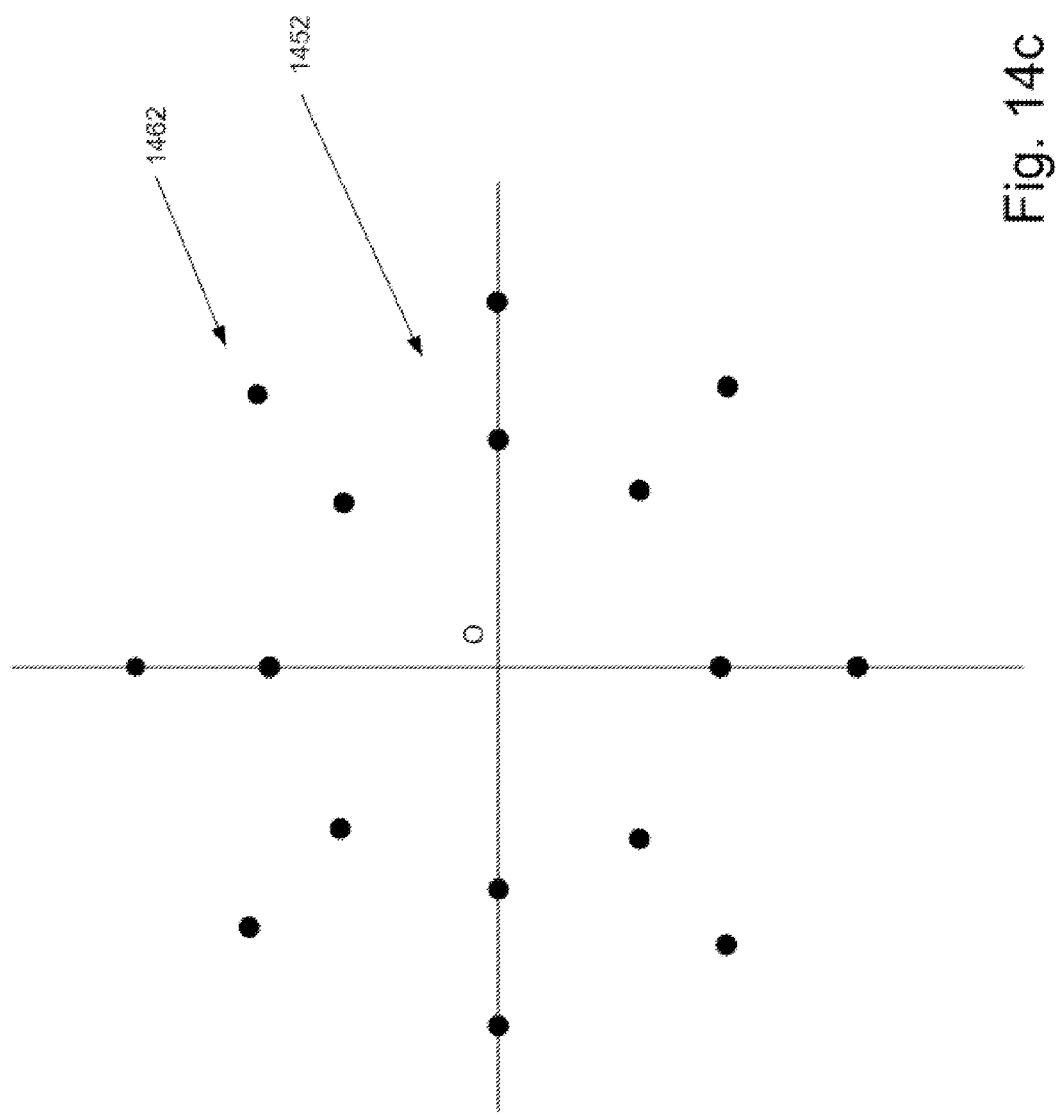

METHOD, SYSTEM, AND APPARATUS FOR CARRIER SYNCHRONIZATION OF QAM MODULATED SIGNALS

FIELD

The present disclosure relates generally to optical communication networks, and in particular to a method, system, and apparatus for feed-forward carrier synchronization for QAM modulated signals.

BACKGROUND

Optical communication systems are known in which optical signals carrying data are transmitted from a transmit node to a receive node over an optical fiber. At the receive node, the optical signals are converted into corresponding electrical signals, which are then further processed.

Various techniques have been proposed to increase the data-carrying capacity of optical communication systems. For example, polarization multiplexing schemes have been implemented in which optical signals having different polarizations, but the same wavelength, are combined. Since each polarization can carry independent data streams, polarization multiplexing can have twice the capacity as a system transmitting light having a single polarization.

In another approach, referred to as quadrature amplitude modulation (QAM), the phase and amplitude of an optical signal may be modulated to carry a symbol, wherein the symbol includes multiple bits. For example, in accordance with a 4-QAM modulation format, the phase of an optical signal may be modulated to be in one of four states, each of which representing a corresponding one of four symbols. For example, each of phase angles of 45°, 135°, 225°, and 315° may correspond to the following bit combinations (symbols) 00, 01, 10, and 11, respectively.

Graphically, each state may be represented by a point on a complex plane and a collection of such points constitutes a constellation. The constellation associated with the 4-QAM modulation format has four points equally spaced from each other on the complex plane. Each point is associated with one of the four phase angles, and the distance each point is away from the origin of the complex plane corresponds to a magnitude of the corresponding state. Typically, in 4-QAM modulation, the magnitude associated with each phase angle (i.e., the distance each point is from the origin) is the same. 4-QAM may also be referred to as quadrature phase shift keying (QPSK).

In order to further increase capacity, higher order QAM modulation formats have been proposed. For example, an 8-QAM modulation format is associated with an eight point constellation, with each point of the constellation being associated with a particular combination of three bits. The 8-QAM constellation includes inner and outer sets of constellation points. The inner set includes four points that are spaced about and provided the same distance away from the origin and resembles the four points of the QPSK modulation format. The outer set also includes four points, but the points have a greater magnitude than that of the inner points, and are thus spaced farther away from the origin. Each of the outer four points is associated with a corresponding one of a plurality of phase angles, which are different from each other and the phase angles of the inner points.

Feedforward carrier recovery (FFCR) is a known technique for recovering the phase of a modulated optical signal. In particular, when the modulated signal is the modulated output of a laser having a large linewidth, such as certain distributed feedback (DFB) lasers, FFCR can provide optimum tracking of the signal. Feedback techniques are also known to provide carrier recovery.

Although FFCR and feedback techniques are effective in demoudlating QPSK modulated optical signals, for example, the carrier of a high order QAM modulated optical signal, such as 8-QAM, may be more difficult to recover because the outer points do not have the same phase angle as the inner points. Accordingly, feedforward and feedback carrier recovery technique are needed that can operate on 8-QAM and other higher order QAM modulation formats.

SUMMARY

Consistent with an aspect of the present disclosure, broadly stated, an apparatus is provided comprising a plurality of photodiodes configured to receive optical signals, each of the optical signals being modulated in accordance with an m-QAM modulation format, where m is an integer greater than 4, the plurality of photodiodes supplying a plurality of outputs in response to the optical signals; and a rotation circuit configured to receive first data, the first data being supplied to the rotation circuit in response to the plurality of outputs, the first data having an associated first constellation, the first constellation including first points, each of which having a first magnitude relative to an origin and each of which having a corresponding one of a first plurality of phases relative to an axis, the first constellation also having second points, each of which having a second magnitude relative to the origin and a corresponding one of a second plurality of phases relative to the axis, the rotation circuit being configured to supply second data having an associated second constellation, the second constellation including third points, each of which having the first magnitude relative to the origin and a corresponding one of the first plurality of phases relative to the axis, the second constellation including fourth points, each of which having the second magnitude relative to the origin and a corresponding one of the first plurality of phases.

Consistent with another aspect of the present disclosure, broadly stated, a method is provided comprising receiving a plurality of optical signals, each of which being modulated in accordance with an m-QAM modulation format, where m is an integer greater than 4; supplying a plurality of outputs in response to the plurality of optical signals; and supplying first data in response to the plurality of outputs, the first data having an associated first constellation, the first constellation including first points, each of which having a first magnitude relative to an origin and each of which having a corresponding one of a first plurality of phases relative to an axis, the first constellation also having second points, each of which having a second magnitude relative to the origin and a corresponding one of a second plurality of phases relative to the axis; and supplying second data in response to the first data, the second data having an associated second constellation, the second constellation including third points, each of which having the first magnitude relative to the origin and a corresponding one of the first plurality of phases relative to the axis, the second constellation including fourth points, each of which having the second magnitude relative to the origin and a corresponding one of the first plurality of phases.

Consistent with another aspect of the present disclosure, broadly stated, a system is provided comprising a transmit node configured to supply optical signals, each of the optical signals being modulated in accordance with an m-QAM modulation format, where m is an integer greater than 4; a receive node, including a plurality of photodiodes configured to receive the optical signals, the plurality of photodiodes supplying a plurality of outputs in response to the optical signals; and a rotation circuit configured to receive first data, the first data being supplied to the rotation circuit in response to the plurality of outputs, the first data having an associated first constellation, the first constellation including first points, each of which having a first magnitude relative to an origin and each of which having a corresponding one of a first plurality of phases relative to an axis, the first constellation also having second points, each of which having a second magnitude relative to the origin and a corresponding one of a second plurality of phases relative to the axis, the rotation circuit being configured to supply second data having an associated second constellation, the second constellation including third points, each of which having the first magnitude relative to the origin and a corresponding one of the first plurality of phases relative to the axis, the second constellation including fourth points, each of which having the second magnitude relative to the origin and a corresponding one of the first plurality of phases.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the present disclosure and together with the description, serve to explain the principles of the present disclosure.

BRIEF DESCRIPTION OF THE DRAWINGS

FIG. 14b illustrates a 16-QAM constellation.

FIG. 14c illustrates a rotated 16-QAM constellation.

DESCRIPTION OF THE EMBODIMENTS

Consistent with the present disclosure, optical signals are modulated in accordance with a higher order QAM modulation format, such as 8-QAM, to carry information, for example. The optical signals are converted to corresponding electrical signals, which are then subject to further processing. In particular, phase data associated with the higher order QAM constellation is processed, such that the outer points of the constellation are rotated to have the same phase as the inner points. As a result, both the inner and outer points have the same phase angle, and both may be more readily processed using feedforward or feedback carrier recovery. After such carrier recovery, the phase data is further processed so that the outer points are rotated back and the information can be extracted from the phase data.

Reference will now be made in detail to the exemplary embodiments of the present disclosure, examples of which are illustrated in the accompanying drawings. Wherever possible, the same reference numbers will be used throughout the drawings to refer to the same or like parts.

Figure 1:
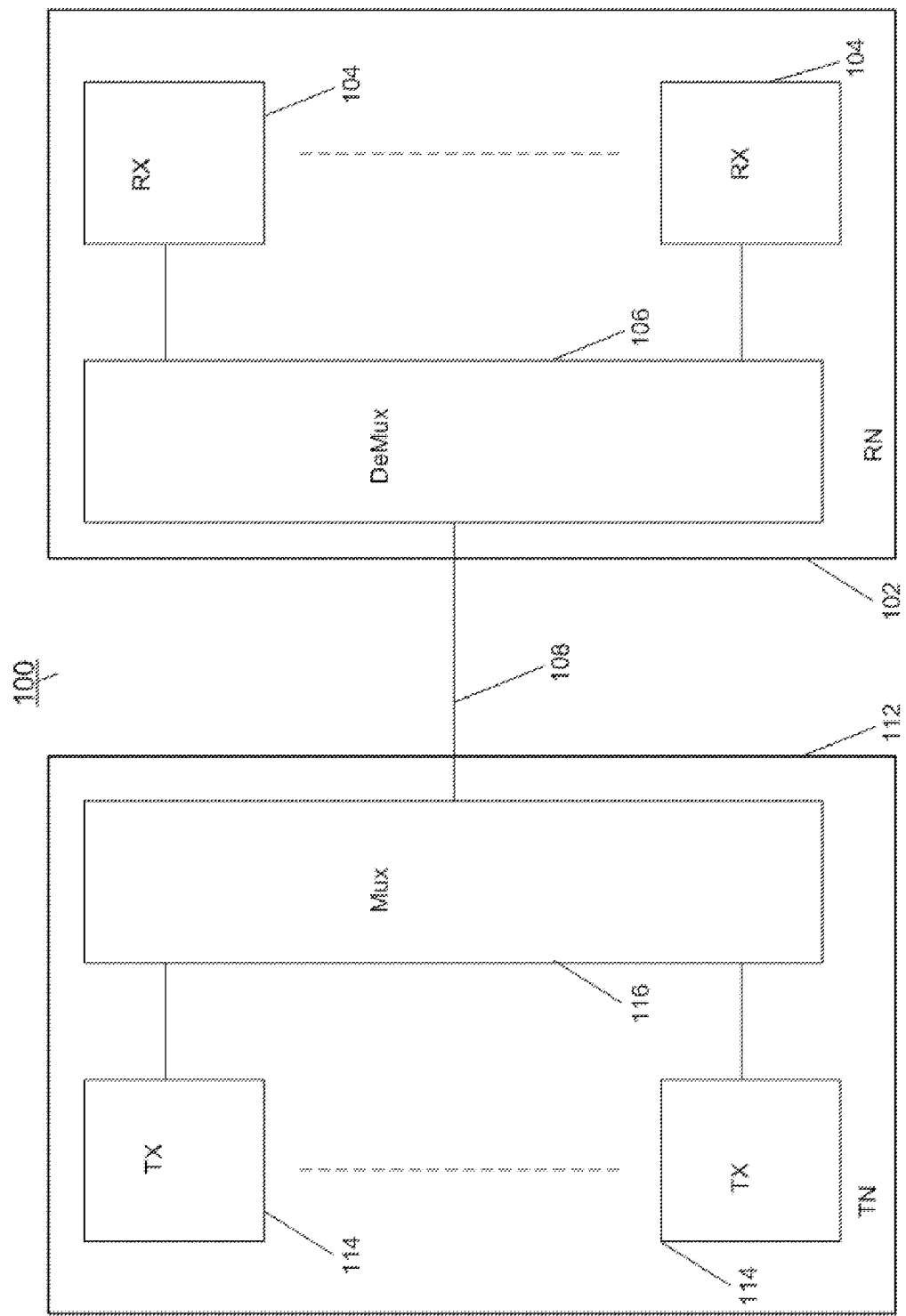
FIG. 1 is a block diagram illustrating a system for the transmitting and receiving of optical signals.

FIG. 1 is a block diagram illustrating a system 100 for transmitting and receiving optical signals. System 100 includes a Transmit Node (TN) 112 that includes a plurality of optical transmitters (TX) 114, each TX 114 converting an electrical signal to a modulated optical signal in accordance with an 8-QAM modulation format, for example, and having one of a plurality of wavelengths (each wavelength being spectrally spaced from one another by a channel spacing). Each TX 114 may further output polarization multiplexed optical signals at each wavelength. Each TX 114 is coupled to an optical multiplexer (Mux) 116 that combines the optical signals onto an optical fiber, identified as line 108 in FIG. 1. The combined optical signals constitute a wavelength division multiplexed (WDM) optical signal that is supplied to a Receive Node (RN) 102, which receives and demultiplexes the WDM optical signal with a demultiplexer (Demux) 106. Demux 106, in turn, supplies each optical signal to a corresponding one of a plurality of receivers (RX) 104. Each of receivers 104 may constitute a coherent receiver, as discussed in greater detail below with reference to FIG. 2.

Figure 2:
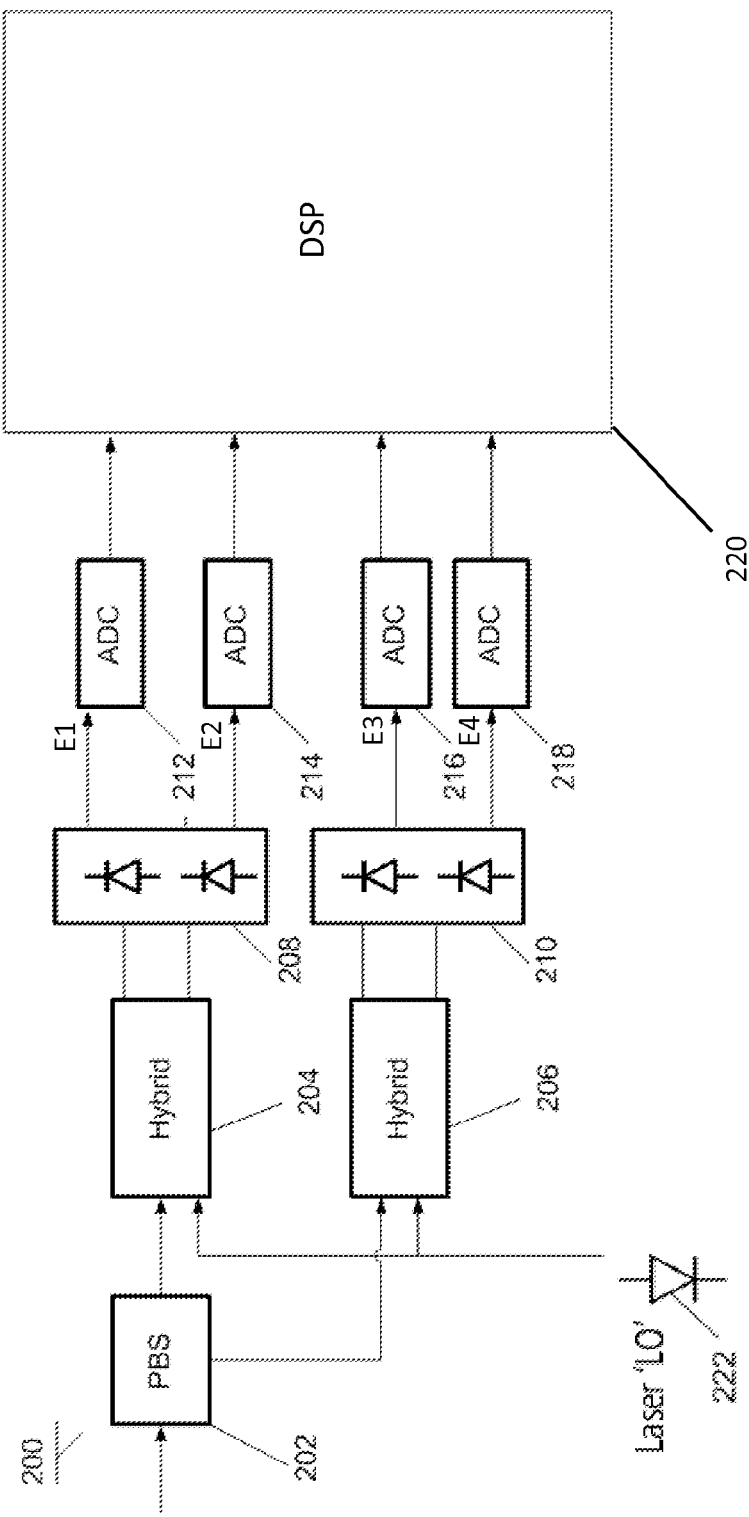
FIG. 2 is a block diagram illustrating a coherent receiver block according to an embodiment of the present disclosure.

FIG. 2 is a block diagram illustrating a coherent receiver 200 according to an embodiment of the present disclosure. Coherent receiver 200 may detect not only the amplitude of the optical signal, but also its phase and polarization. In one example, a polarization multiplexed optical signal is supplied to receiver 200. In that case, receiver 200 may include a polarization beam splitter (PBS) 202 operable to receive the input optical signal and to separate the signal into orthogonal polarizations, also referred to as X and Y polarizations; i.e., vector components of the optical E-field of an incoming optical signal transmitted on optical fiber 108. The orthogonal polarizations are then mixed with reference light from a laser local oscillator (LO) 222 by hybrids 204, 206. Each of hybrids 204, 206 outputs two composite signals, such that a total of four composite signals are supplied. The four composite signals represent the in-phase and quadrature components of the optical E-field on X and Y polarizations. The composite signals at the output of the hybrids 204, 206 are supplied to respective photodiodes in a set of photodetectors 208, 210, to generate four analog electrical output signals (E1 to E4), for example.

The four output signals E1 to E4 from the photodiodes in photodetectors 208, 210 constitute four base-band analog electrical signals linearly proportional to the in-phase and quadrature components of the optical E-field on X and Y polarizations. After amplification and/or other processing, the analog signals are then sampled at a sampling rate by respective analog-to-digital converter (ADC) circuits 212, 214, 216, 218, each coupled to a corresponding one of the photodiodes of photodiode pair 208. Each of ADC circuits 212, 214, 216, 218 is configurable to supply a corresponding one of a plurality of digital signals to a Digital Signal Processor (DSP) 220. In the example in FIG. 2, the DSP 220 may include FFCR circuitry 300 shown in FIG. 3.

Figure 7A:
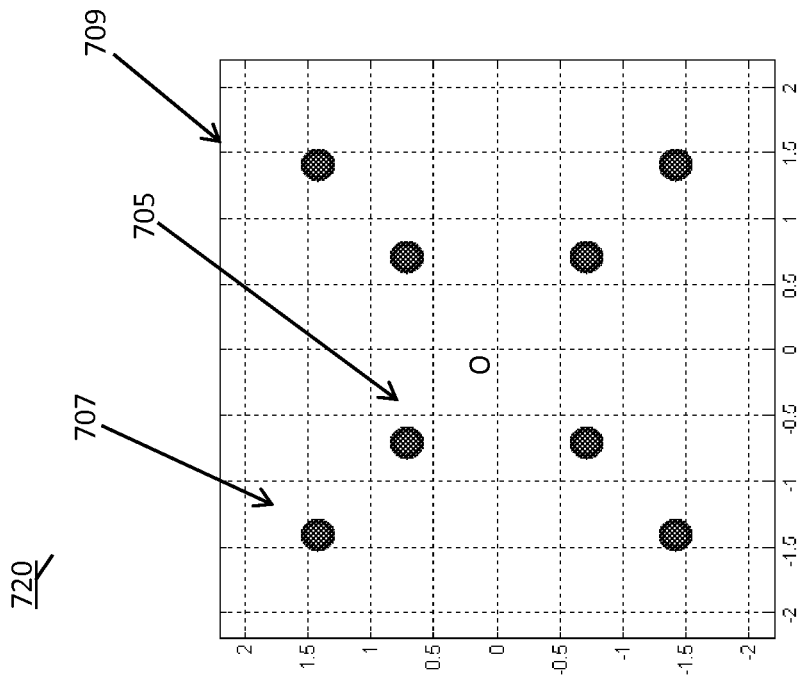
FIG. 7a illustrates an exemplary constellation diagram for an 8-QAM modulation format according to an aspect of the present disclosure.

Data output from ADC circuit 212, 214, and 216, and 218 may include phase noise, as noted above. Without such phase noise, the data output from the ADC circuits would, in this example, be represented by an 8-QAM constellation 710, including inner (701) and outer (703) points (see FIG. 7a). Each of inner points 701 has a first magnitude relative to origin O on complex plane 709 and each has a corresponding one of a first plurality of first phase values (e.g., of 45°, 135°, 225°, and 315°). Each of outer points 703 has, relative to origin O, a second magnitude (greater than the first magnitude) and a corresponding one of a second plurality of phase values (e.g, 0°, 90°, 180°, and 270°).

Figure 4:
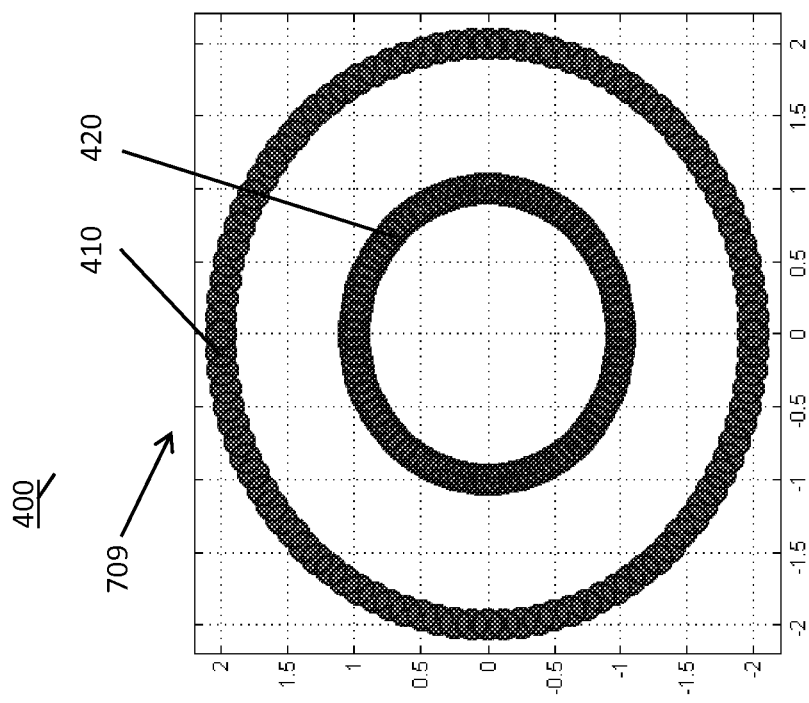
FIG. 4 is a diagram illustrating the circular nature of the data points in the constellation for an exemplary 8-QAM modulation format according to an aspect of the present disclosure.

In FIG. 4, however, the 8-QAM constellation is subject to phase noise, such that the phase angles of the inner (701) and outer (703) points are randomly distributed about the origin O on complex plane 709. Accordingly, the 8-QAM constellation appears as two concentric circles 410 and 420, and points (phase states) 701 and 703 are not readily discernible.

Figure 3:
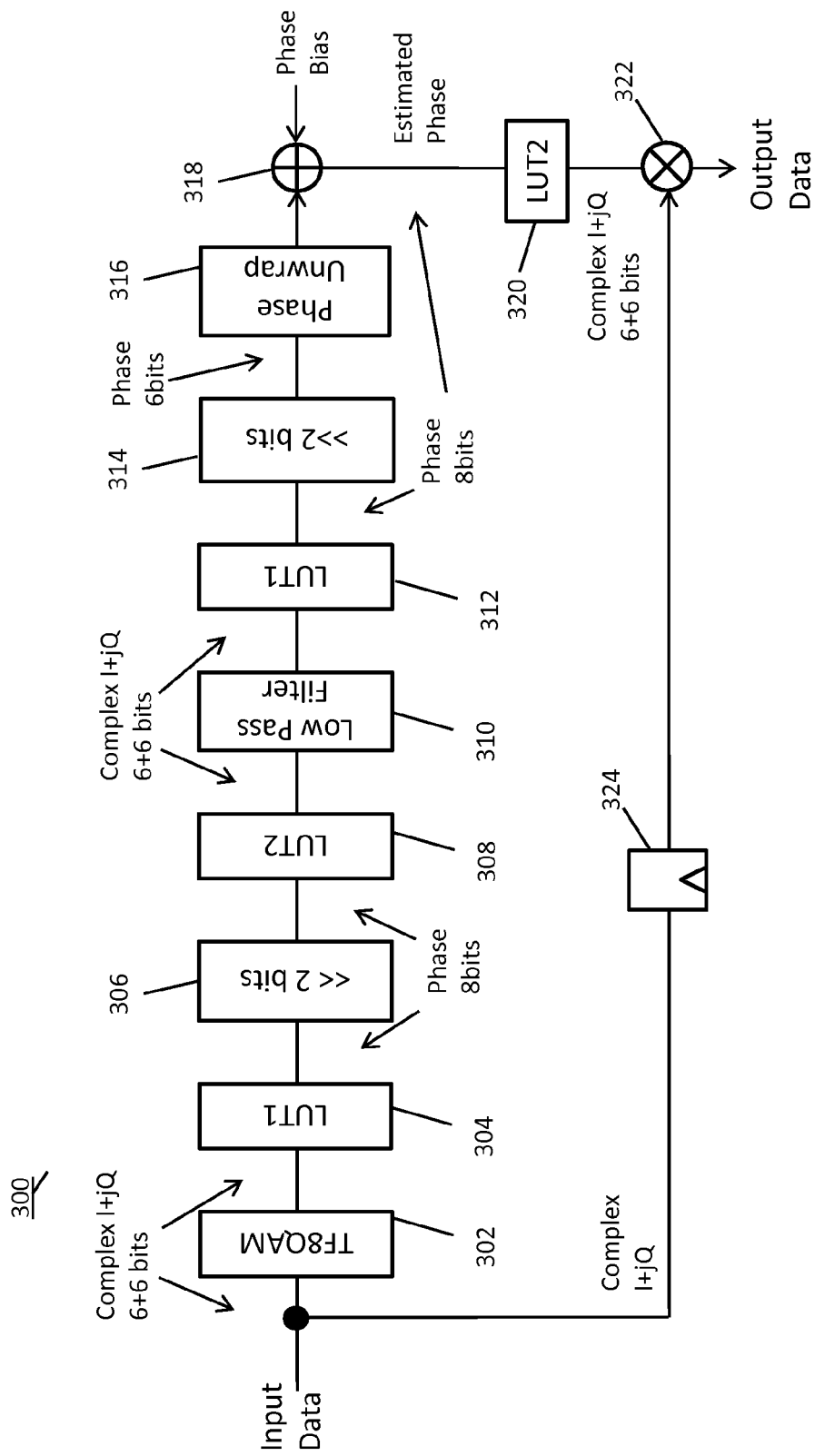
FIG. 3 is a block diagram illustrating an exemplary feedforward carrier recovery circuit and a rotation circuit provided therein.

FIG. 3 illustrates feedforward carrier recovery (FFCR) circuit 300 consistent with the present disclosure in greater detail. Circuit 300 may be provided in DSP 220. Input data from one or more of ADC circuits 212, 214, 216, and 218 is supplied to circuit 300 and typically includes phase noise. Accordingly, the input data may have an associated constellation similar to that shown in FIG. 4. Alternatively, the outputs from the ADC circuits may be further processed, and the input data to circuit 300 may result from such further processing and still be indicative of the outputs of the ADC circuits As further shown in FIG. 3, the input data is fed to rotation circuit 302 (TF8QAM), which will next be described with reference to FIG. 6

Rotation circuit 302 includes a comparator circuit 602, multiplier circuits 606 and 608, and a selector circuit 604. The input data is supplied to the comparator circuit 602 and to the multipliers circuits 606 and 608.

A magnitude threshold is supplied to the comparator circuit 602. The magnitude threshold may be used for the process of rotating the outer constellation points 703 to line-up in phase with the inner constellation points 701. The input data has in-phase (I) and quadrature (Q) components. The comparator circuit 602 is configured to compare the magnitude associated with the input data and output a "1" if the sum $(I^2+Q^2)$ is greater than the magnitude threshold, otherwise the comparator circuit 602 outputs a 0, i.e., "0" if the sum $(I^2+Q^2)$ is not greater than the magnitude threshold. The comparator circuit 602 supplies the control signals "0" and "1" to the selector circuit 604.

The input data is also supplied to the multiplier circuits 606 and 608. The multiplier circuit 606 multiplies the input data by 1.0, in order to retain the same phase and magnitude. The multiplier circuit 608 also multiplies the input data by $e^{j\pi/4}$ to rotate the input data phase by π/4. The products from the multiplier circuits 606 and 608 are supplied to two inputs of the selector circuit 604.

Figure 6:
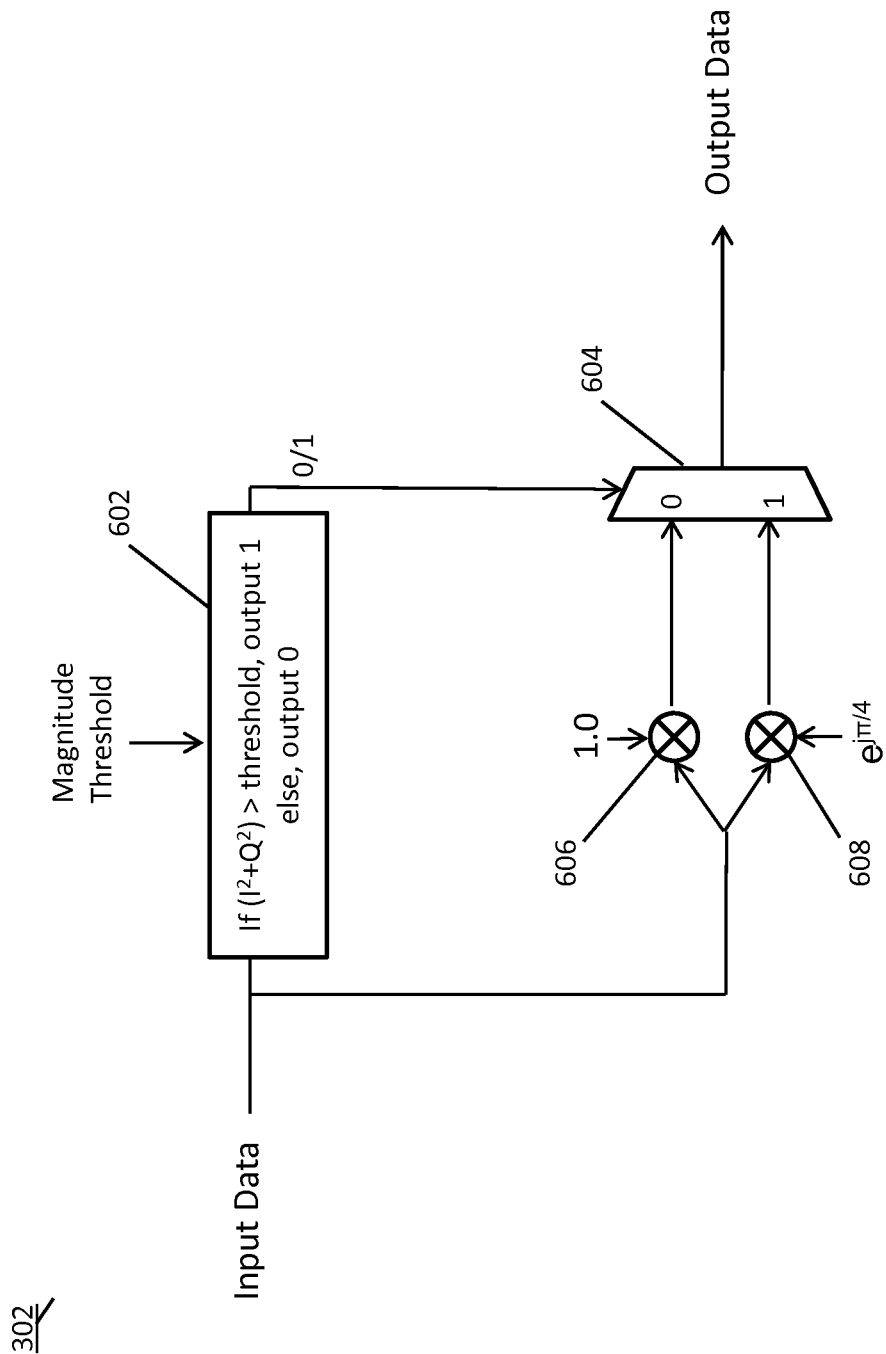
FIG. 6 is a block diagram illustrating an embodiment of the rotation circuit in FIG. 3 according to an aspect of the present disclosure.

The selector circuit 604 may function as a 2-to-1 multiplexer as further shown in FIG. 6. The selector circuit 604 is configured to select one of the products supplied by the multipliers 606 and 608 in response to the control signals ("0" and "1") supplied by the comparator circuit 602. In operation, the selector circuit 604 supplies the product from the multiplier 606 as output data in response to a "0" being supplied at the control input, and outputs the product from the multiplier 608 in response to a "1" being supplied at the control input. Thus, the output data supplied by the selector circuit 604 is the input data (multiplied by 1.0) if the comparator circuit 602 provides a "0", and the output data supplied by the selector circuit 604 is the input data rotated (by π/4 radians or 45 degrees in this example) in phase if the comparator circuit 602 provides a "1".

Figure 7B:
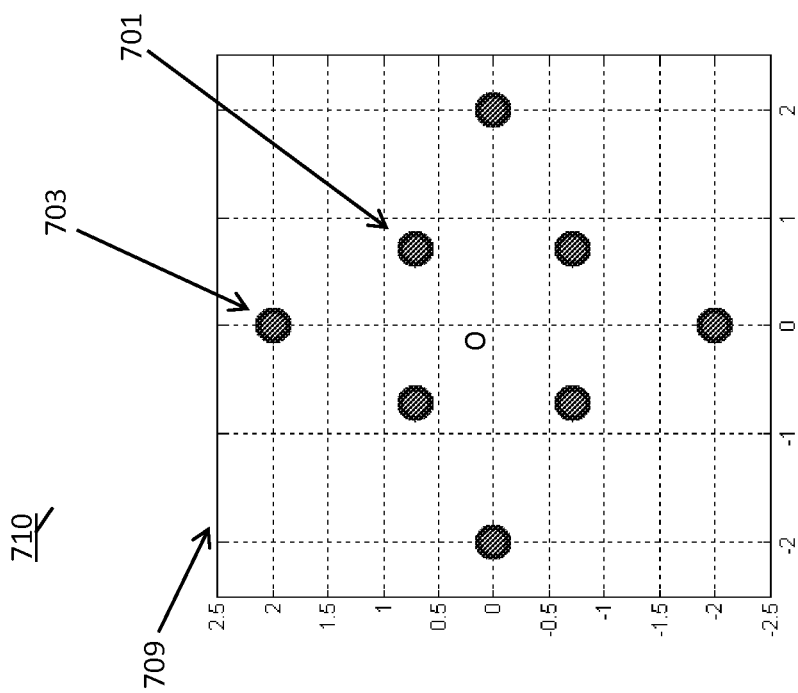
FIG. 7b illustrates an exemplary constellation diagram to illustrate the function of the exemplary rotation circuit in FIG. 6 according to an aspect of the present disclosure.

FIG. 7b illustrates constellation 720 associated with the output data from the rotation circuit 302. In constellation 720, outer points 703 are rotated π/4 radians and therefore have each of the phases or phase values as inner points 701. Thus, both the inner (701) and outer (703) points resemble the constellation of a QPSK modulation format. FFCR, as noted above, can operate to recover the carrier associated QPSK modulated optical signals, and therefore an FFCR technique, as described below, can be used to recover the carrier associated with the input data.

Figure 11:
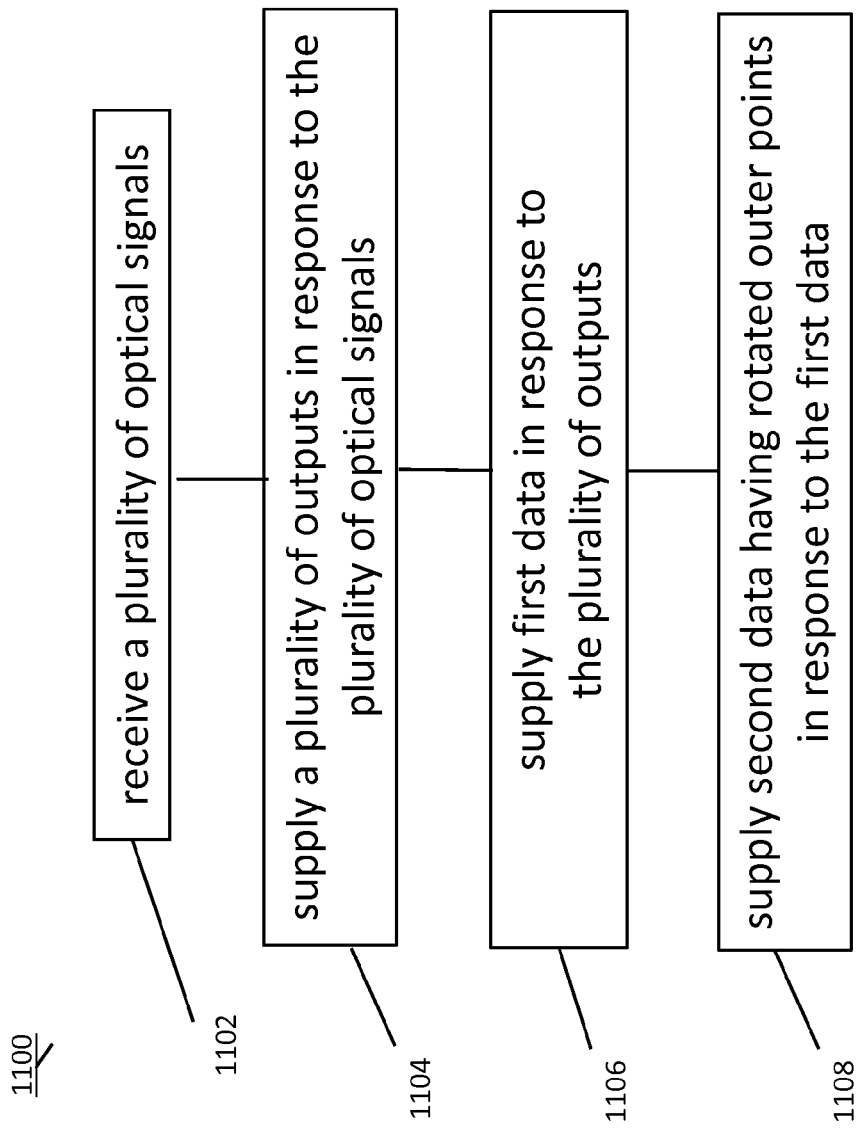
FIG. 11 is a process diagram illustrating a rotation method according to an aspect of the present disclosure.

Operation of rotation circuit 302 in conjunction with other circuitry in receiver 104 will next be described with reference to flowchart 1100 shown in FIG. 11. As noted above, the input data supplied to rotation circuit 302 may be associated with data carried by an 8-QAM modulated optical signal supplied to receiver 104 (see FIG. 1). Thus, in a first step (step 1102), a plurality of optical signals, which may be modulated in accordance with the 8-QAM modulation format, for example, are received by receiver 104. In the next step (step 1104), a plurality of outputs are generated in response to the plurality of optical signals. Such outputs may include the outputs from one or more ADC circuits 212, 214, 216, and 218. In step 1106, first data is supplied in response to the plurality of outputs. Such first data may correspond to the input data to circuit 302 and may have an associated first constellation corresponding to constellation 710 shown in FIG. 7a. In Step 1108, second data having an associated second constellation may be supplied in response to the first data. Such second data may correspond to the data output from rotation circuit 302, and the second constellation may correspond to constellation 720 shown in FIG. 7b, which shows inner points 705 (corresponding to inner points 701) and outer points 707 (corresponding to outer points 703 rotated by 45°). As further shown in FIG. 7b, outer points 707 have the same phase values or phase as inner points 705. Accordingly, as noted above, FFCR can be performed on both the inner (705) and outer (707) points of constellation 720 shown in FIG. 7b.

In particular, there are known implementations of feedforward carrier recovery for QPSK modulated data. One known example is the Viterbi-Viterbi algorithm. According to an embodiment of the present disclosure, an implementation of the Viterbi-Viterbi algorithm may be provided to demodulate the QPSK output from the rotation circuit 302, as will be described in further detail below. Alternatively, other implementations of feed-forward carrier recovery for the four phase QPSK format may be used as long as they are consistent with the present disclosure.

FFCR of the data output from rotation circuit 302 will next be described with reference to FIG. 3 and flowchart 1200 shown in FIG. 12. The data output from rotation circuit 302 is complex, and thus, has both real and complex components (I+jQ). For example, the real or in-phase (I) component may have six bits, and the complex or Q component may also have six bits. Such data may be supplied to a memory, such as a look-up-table, LUT1 304, for conversion to a phase value or data representative of a first phase angle. The contents of the look-up table LUT1 304 may satisfy equation (1):

$$y = \tan^{-1}\left(\frac{\text{Im}(x)}{\text{Re}(x)}\right) \quad (1)$$

where x is n input to LUT1 304 and y is the output phase value or angle. The phase value can be represented by an 8 bit quantity.

The phase data output from LUT1 304 is next left-shifted by two bits (i.e., multiplied by 4) in left bit shifter circuit 306 (see also step 1204), and the bit-shifted output is supplied to lookup table LUT2 308. The contents of LUT2 308 satisfy:

$$y = \cos(x) + j \cdot \sin(x) \quad (2)$$

where x is an input to LUT2 308 and y is an output. Thus, LUT2 308 converts the received phase data from shifter 306 to complex data having the form I+jQ (see step 1206). The complex data output from LUT2 308 is next supplied to low pass finite impulse response (FIR) filter 310, which filters or attenuates noise present in such data. For example, low pass filter 310 may average the supplied complex data over a plurality of symbols to produce a time-averaged estimate. The low pass filter 310 will next be described with reference to FIGS. 3, 8 and 9.

Figure 8:
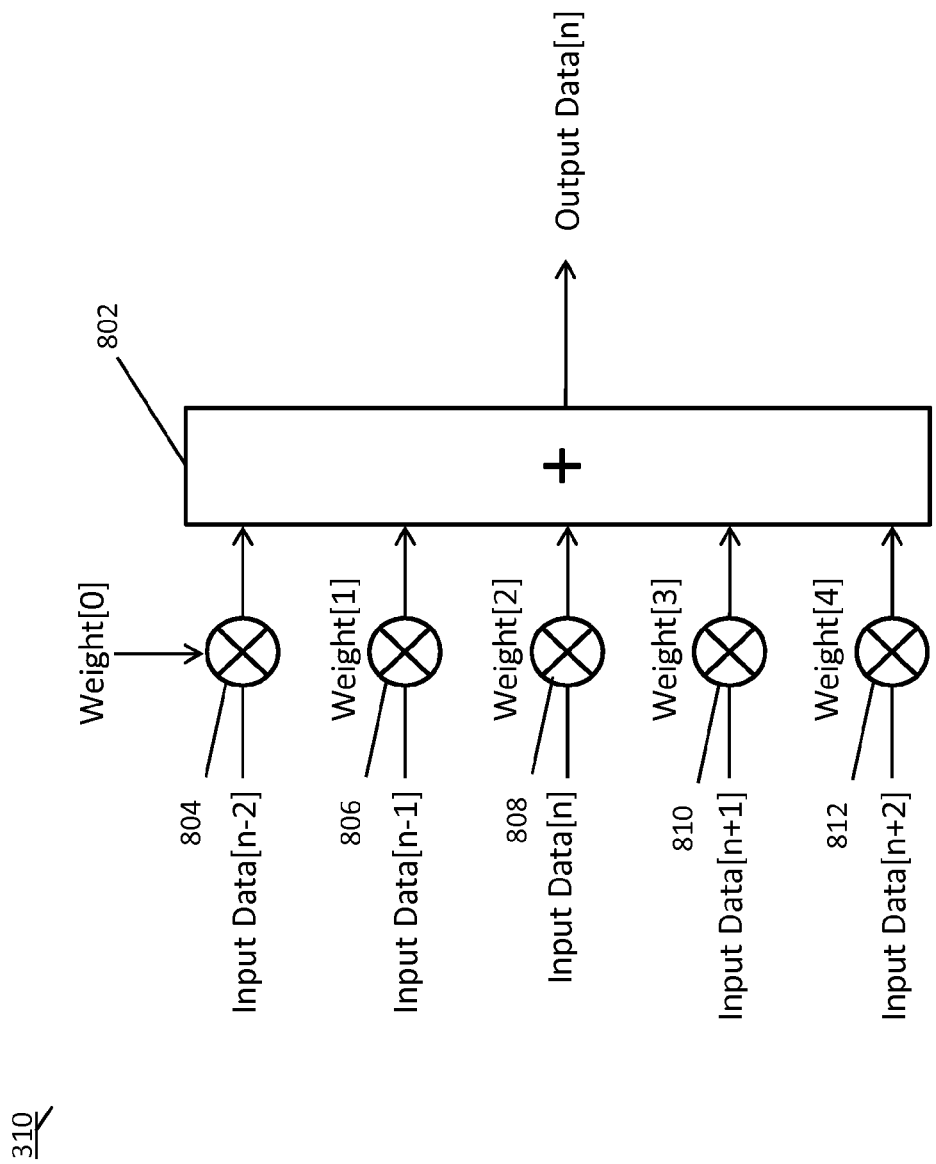
FIG. 8 is a block diagram illustrating an exemplary FIR circuit which is an embodiment of the exemplary low pass filter circuit in FIG. 3 according to an aspect of the present disclosure.

FIG. 8 shows FIR filter 310 in greater detail. FIR filter 310 may include five taps (e.g., multiplier circuits 804, 806, 808, 810, and 812), although fewer taps or more taps are contemplated and considered within the scope of this disclosure.

FIR circuit 310 includes multiplier circuits 804, 806, 810, and 812, and an adder circuit 802. The input and output data of FIR circuit 310 are complex data (6 bit real, 6 bit imaginary), as discussed above. FIR circuit 310 averages five input data samples for each data output sample. In FIR circuit 310, a vector of tap weights including Weight[0], Weight[1], Weight[2], Weight[3], and Weight[4] are applied to Input Data[n−2], Input Data[n−1], Input Data[n], Input Data[n+1], and Input Data[n+2] respectively. The vector of tap weights may be dynamically optimized based on the time-varying statistics of the phase.

For example, tap weights Weight[0], Weight[1], Weight[2], Weight[3], and Weight[4] can also be dynamically calculated based on the magnitude of the input data. Namely, input data having an associated magnitude that is slightly above the magnitude threshold may be erroneously identified as being below the magnitude threshold, while input data having an associated magnitude that is slightly below the magnitude threshold may be erroneously identified as being above the magnitude threshold. Thus, input data having a magnitude close to the magnitude threshold may be prone to erroneous threshold determinations and thus may be weighted with relatively low tap weight values. On the other hand, fewer errors are likely to occur in determining whether input data having a relatively large threshold exceeds the magnitude threshold. Such input data may therefore be weighted more heavily with tap weights having higher values. The dynamic weighting based on the magnitude of the input data can be implemented using a look-up-table as shown in an example in FIG. 9.

Figure 9:
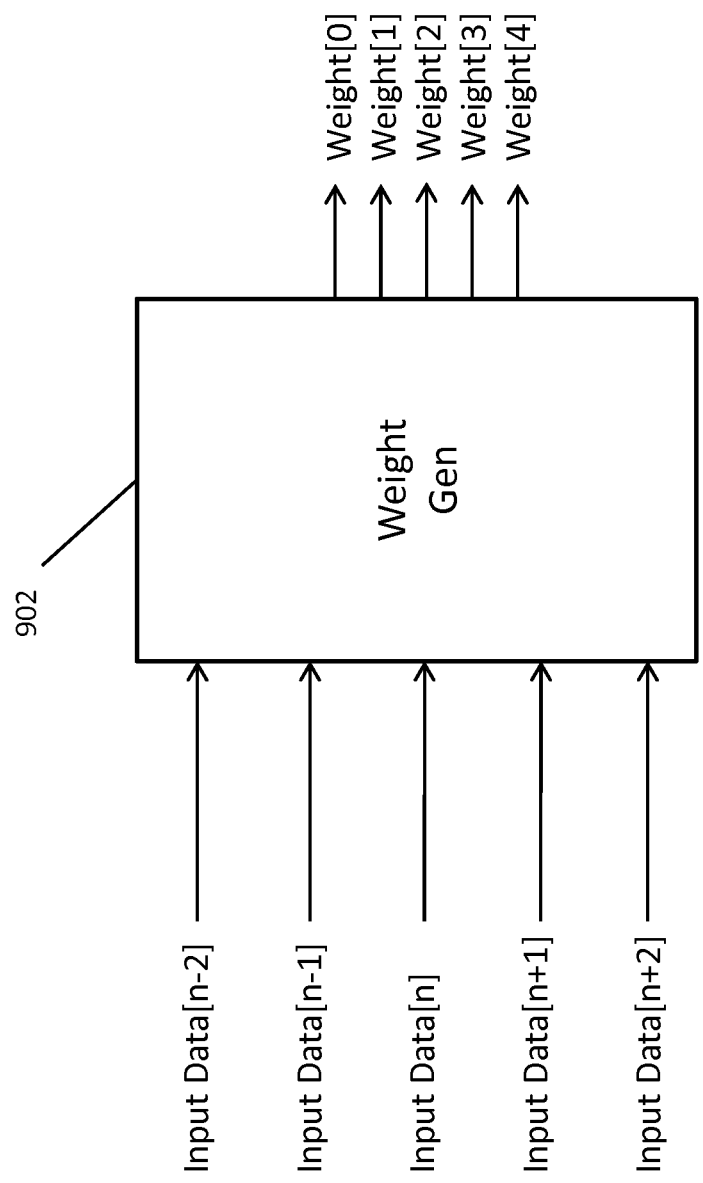
FIG. 9 is a block diagram illustrating a block diagram of an exemplary dynamic weight generation for a FIR structure for the exemplary low pass filter circuit in FIG. 8 according to an aspect of the present disclosure.

In FIG. 9, dynamic weight generation circuit 902 receives an input data vector including Input Data[n−2], Input Data [n−1], Input Data[n], Input Data[n+1], and Input Data[n+2]. The weight generator circuit 902 may have a look-up table from which, in response to the input data, a corresponding tap weight vector including Weight[0], Weight[1], Weight[2], Weight[3], and Weight[4] is generated. The dynamically generated weights at the output of the weight generator 900 can be used in the FIR filter 310.

Figure 12:
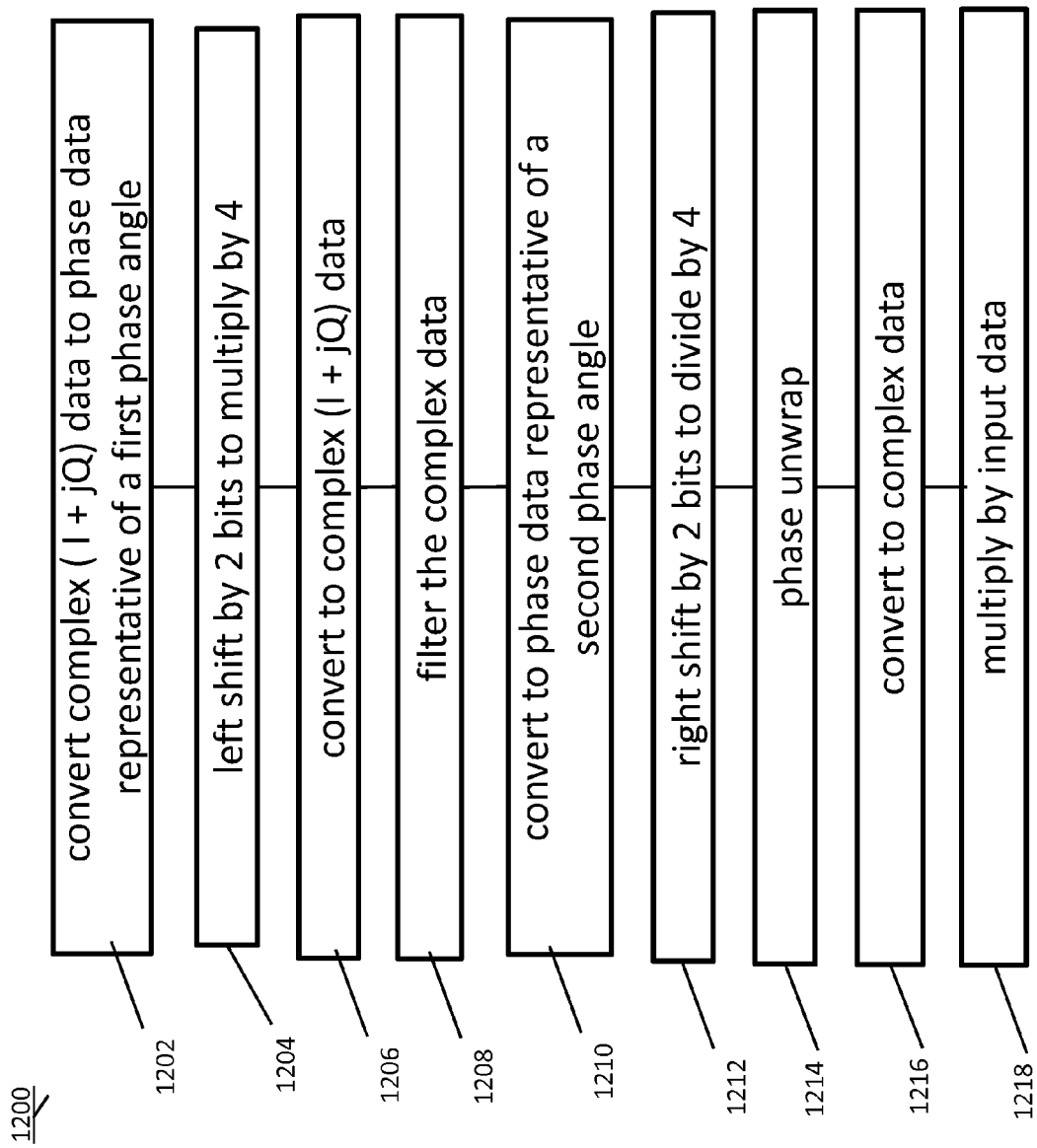
FIG. 12 is a process diagram illustrating a method for processing the data supplied by the rotation method in FIG. 11 for feed-forward carrier recovery and synchronization according to an aspect of the present disclosure.

Returning to FIG. 3, LUT1 circuit 312 is provided for converting the complex filtered data from the low pass filter 310 to 8 bit phase data (see step 1210 of FIG. 12). The contents of LUT1 312 satisfy equation 1, noted above. Such data may be representative of a second phase angle, which is unwrapped, as discussed in greater detail below. The phase data is then right shifted by 2 bits in shifter circuit 314 to thereby divide the data by 4 and obtain a sequence of six-bit phase output values in the range of +/−45 degrees. The six bits phase values are then supplied to phase unwrap circuitry 316 (step 1214).

Figure 10:
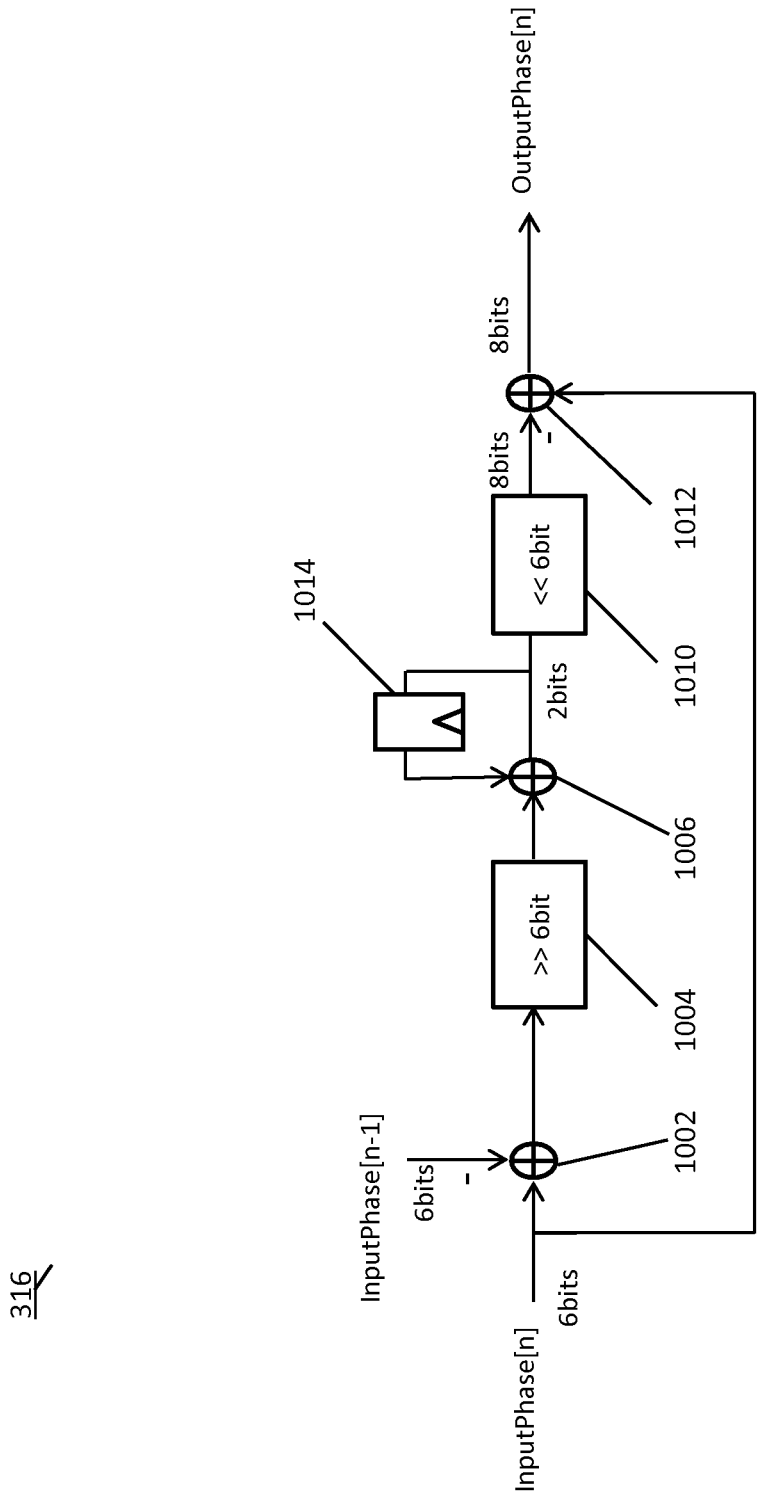
FIG. 10 is a block diagram illustrating an embodiment of the exemplary phase unwrap circuit of the exemplary circuit in FIG. 3 according to an aspect of the present disclosure.

FIG. 10 is a block diagram illustrating phase unwrap circuitry 316 in greater detail. Phase unwrap circuit 316 includes modulus 8 bit adder circuits 1002 and 1012, a modulus 2 bit adder circuit 1006, a ">>6 bit" (right shift) circuit 1004, a delay circuit 1014, and a "<<6 bit" (left shift) circuit 1010.

Input phase values supplied to the phase unwrap circuit 316 are in the range of +/−45 degrees (6 bits) consistent with the four phase QPSK constellation. Preferably, these phase values are "unwrapped": by integer multiple of 90 degrees in order to produce phase estimate values that are in the range of +/−180 degrees (8 bits), The inputphase[n] (the input phase value of a current symbol) and the negative of the input phase for the prior symbol, −inputphase[n−1], are added using the modulus 8 bit adder circuits 1002. The sum from the modulus 8 bit adder circuits 1002 is the modulus 8 difference between the inputphase[n] and the inputphase[n−1]. The modulus 8 difference is supplied to the ">>6 bit" (right shift) circuit 1004 which right shifts the data 6 bits. As a result, input phase steps of integer multiples of 90 degrees are detected. The input phase steps are integrated in the modulus 2 bit adder 1006 by adding the shifted phase supplied by the ">>6 bit" (right shift) circuit 1004 to the output of the modulus 2 bit adder 1006 delayed by the delay circuit 1014. The two bits for the sum supplied by the modulus 2 bit adder 1006 is supplied to the "<<6 bit" (left shift) circuit 1010 which left shifts the data 6 bits to provide an 8 bit output. The negative (−) of the 8 bits output from the "<<6 bit" (left shift) circuit 1010 are added to the six bits of the Inputphase[n] by another modulus 8 bit adder 1012, with the sum being the OutputPhase[n] which is an unwrapped phase vector having values in the range of +/−180 degrees (8 bits).

The output from phase-unwrap circuit 316 may optionally be applied to adder circuit 318, which may also receive a phase bias signal. Adder circuit 318 outputs data that is indicative of an estimated phase. The biased phase may then be supplied to LUT2 320, which converts the received estimated phase data to complex (I+jQ) data (see also step 1216).

Figure 5:
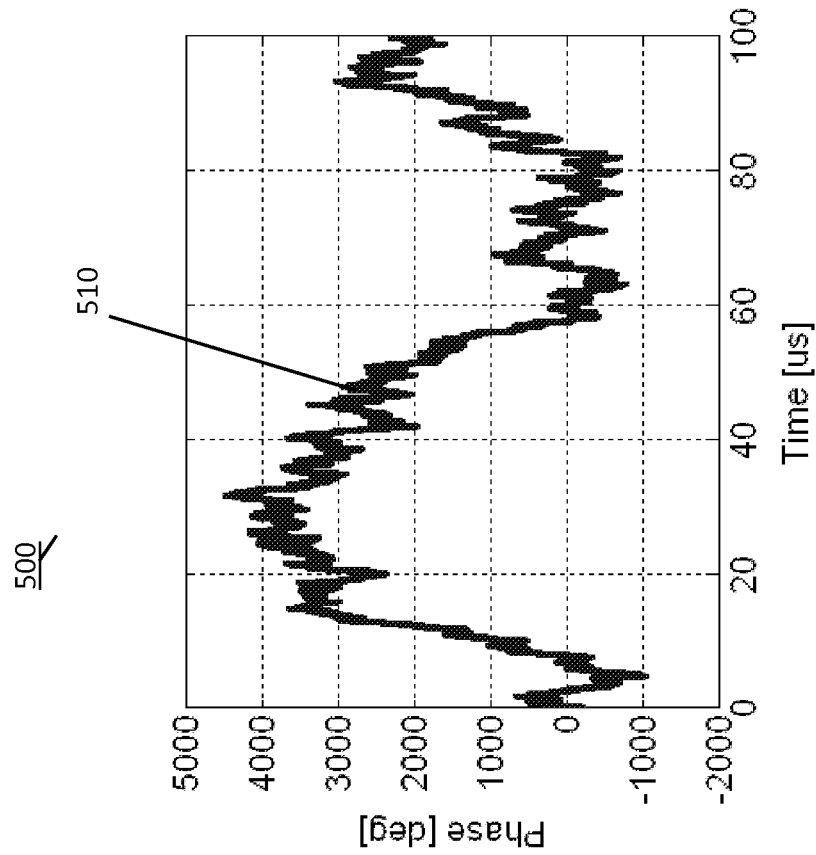
FIG. 5 is a timing diagram illustrating an exemplary estimate phase after a phase bias has been applied according to an aspect of the present disclosure.

FIG. 5 illustrates an exemplary estimated phase as a function of time after application of the phase bias.

The output of LUT2 320 is next supplied to a multiplier circuit 322, which multiplies the LUT2 320 output by the input data (see also step 1218). The input data, however, is delayed by delay circuit 324 by an amount of time substantially equal to the amount of time required for circuit 300 to generate the output from LUT2 320. The multiplication performed by circuit 322 de-rotates the outer points 703, and locks the phase associated with each constellation point to therefore achieve carrier phase synchronization. The product supplied by multiplier circuit 322 is the output data in a carrier recovered and synchronized 8-QAM modulation format.

Figure 13:
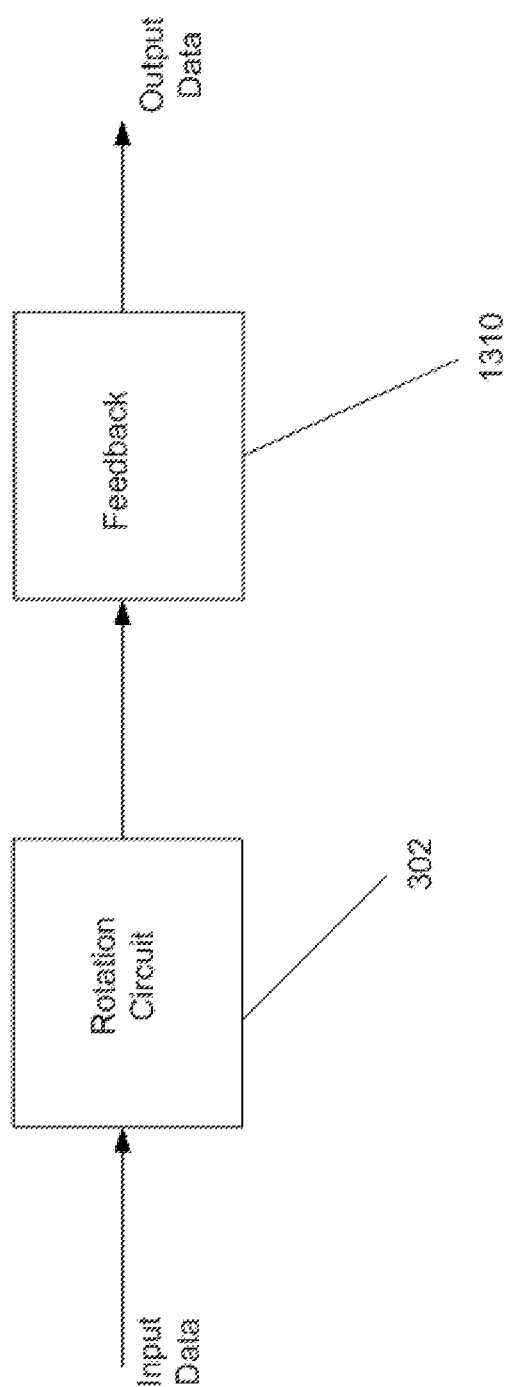
FIG. 13 illustrates a further example including feedback carrier recovery.

Although FFCR circuitry is discussed above to provide carrier recovery and synchronization, other techniques are contemplated herein. For example, as shown in FIG. 13, the output of rotation circuit 302 may be provided to a feedback circuit 1310 to provide such carrier recovery and synchronization.

Although an 8-QAM modulation format has been discussed above, other m-QAM modulation formats, where m is an integer greater than 4, are contemplated herein.

Figure 14A:
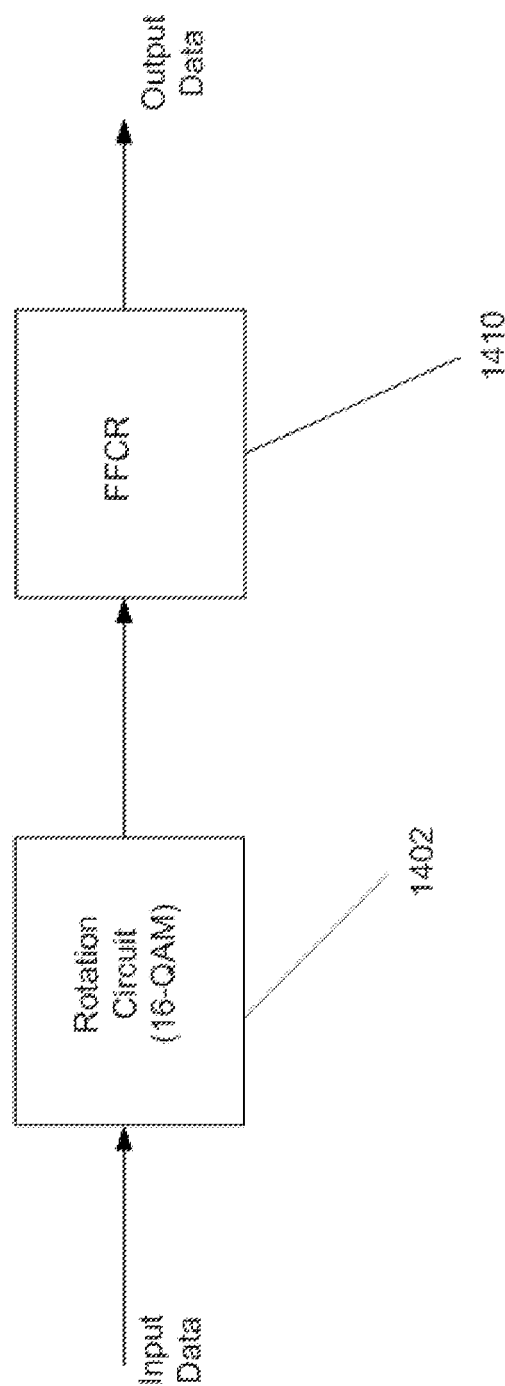
FIG. 14a illustrates a block diagram including a rotation circuit that rotates the constellation of a 16-QAM constellation.
Figure 15:
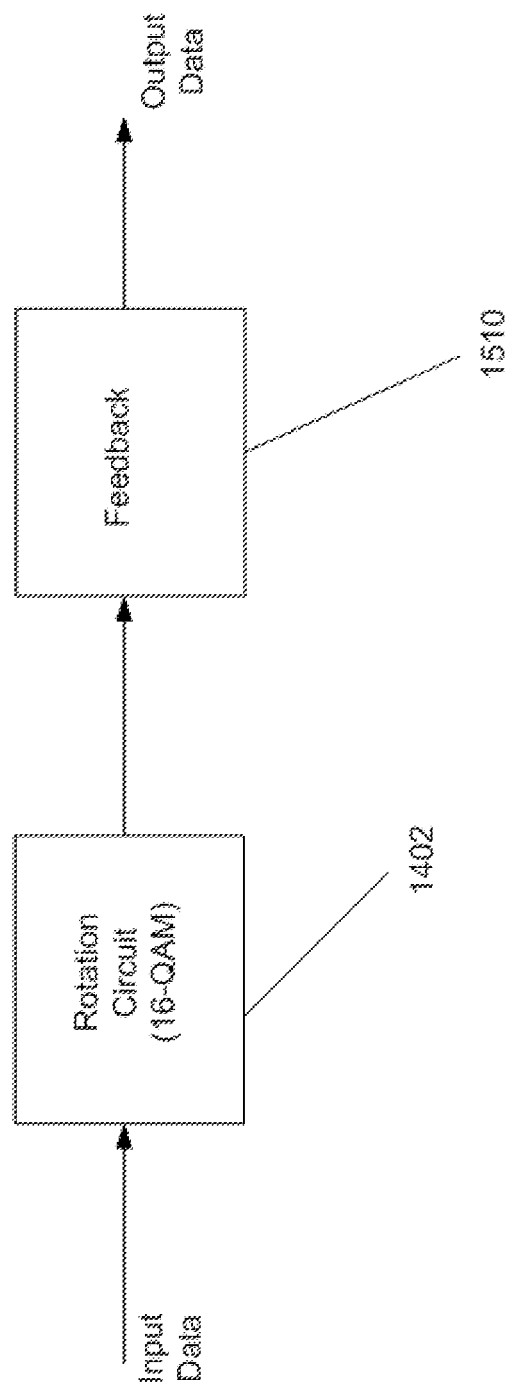
FIG. 15 illustrates a further example including feedback carrier recovery.

For example, as shown in FIG. 14a, input data modulated in accordance with a 16-QAM (or Star 16-QAM) modulation format may be supplied to rotation circuit 1402, having the same or similar structure as rotation circuit 302, but having for example, a threshold detector (e.g., circuit 602) that detects a different threshold. The output from circuit 1402 may then be supplied to FFCR circuit 1410 including circuitry similar to the look-up table, filter, bit shifter, and phase unlock circuits discussed above. Alternatively, rotator circuit 1402 may supply an output to feedback circuit 1510 shown in FIG. 15.

FIG. 14b illustrates a Star 16-QAM constellation including inner points 1452 and outer points 1462. Data output from rotation circuit 1402 has an associated constellation shown in FIG. 14c in which outer points 1462 are rotated relative to inner points 1452 by, for example, π/8 radians. It is noted that although the examples discussed above describe rotation by either π/4 or π/8 radians, it is understood that other predetermined angle rotations are contemplated herein.

As described above, feed-forward carrier recovery may be used to demodulate, for example, an 8-QAM modulated optical signal, by rotating the other points of the associated constellation to resemble QPSK constellation points. A corresponding method is also described herein. According to another aspect of the present disclosure, by enabling a feed-forward or a feedback approach to be used for the demodulation and carrier synchronization of higher order QAM (e.g., 8-QAM) modulated optical signals, higher spectral efficiencies of 4 bits/sec/Hz can be achieved. As a result, higher data rates can be obtained, such as 100 Gbit per channel (optical signal) in a 25 GHz channel spacing or 200 Gbit per channel in a 50 GHz spacing.

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
  a plurality of photodiodes configured to receive optical signals, each of the optical signals being modulated in accordance with an m-QAM modulation format, where m is an integer greater than 4, the plurality of photodiodes supplying a plurality of outputs in response to the optical signals; and
  a rotation circuit configured to receive first data, the first data being supplied to the rotation circuit in response to the plurality of outputs, the first data having an associated first constellation, the first constellation including first points, each of which having a first magnitude relative to an origin and each of which having a corresponding one of a first plurality of phases relative to an axis, the first constellation also having second points, each of which having a second magnitude relative to the origin and a corresponding one of a second plurality of phases relative to the axis, each of the second plurality of phases being different than each of the first plurality of phases, the rotation circuit being configured to supply second data having an associated second constellation, the second constellation including third points, each of which having the first magnitude relative to the origin and a corresponding one of the first plurality of phases relative to the axis, the second constellation including fourth points, each of which having the second magnitude relative to the origin and a corresponding one of the first plurality of phases,
  wherein the rotation circuit includes:
  a selector circuit, wherein in response to a first control signal, the selector circuit passes a first portion of the first data as a first portion of the second data if the first portion of the first data has an associated magnitude that is less than a threshold magnitude, and, in response to a second control signal, the selector circuit supplying a second portion of the first data with a rotated phase relative to one of the second plurality of phases if the second portion of the first data has an associated magnitude that is greater than the threshold magnitude.

2. An apparatus comprising:
  a plurality of photodiodes configured to receive optical signals, each of the optical signals being modulated in accordance with an m-QAM modulation format, where m is an integer greater than 4, the plurality of photodiodes supplying a plurality of outputs in response to the optical signals;
  a rotation circuit configured to receive first data, the first data being supplied to the rotation circuit in response to the plurality of outputs, the first data having an associated first constellation, the first constellation including first points, each of which having a first magnitude relative to an origin and each of which having a corresponding one of a first plurality of phases relative to an axis, the first constellation also having second points, each of which having a second magnitude relative to the origin and a corresponding one of a second plurality of phases relative to the axis, each of the second plurality of phases being different than each of the first plurality of phases, the rotation circuit being configured to supply second data having an associated second constellation, the second constellation including third points, each of which having the first magnitude relative to the origin and a corresponding one of the first plurality of phases relative to the axis, the second constellation including fourth points, each of which having the second magnitude relative to the origin and a corresponding one of the first plurality of phases; and
  a feed-forward carrier recovery circuit, the rotation circuit being provided in the feed-forward carrier recovery circuit.

3. An apparatus in accordance with claim 2, wherein a difference between one of the first plurality of phases and a corresponding one of the second plurality of phases is predetermined.

4. An apparatus in accordance with claim 2, wherein a difference between one of the first plurality of phases and a corresponding one of the second plurality of phases is π/4 radians.

5. An apparatus in accordance with claim 2, wherein a difference between one of the first plurality of phases and a corresponding one of the second plurality of phases is π/8 radians.

6. An apparatus in accordance with claim 1, further including a comparator circuit, the comparator circuit being configured to compare the magnitude associated with the first portion of the first data with the threshold magnitude and compare the magnitude associated with the second portion of the first data with the threshold magnitude, the comparator circuit being configured to selectively supply one of the first and second control signals to the selector circuit.

7. An apparatus in accordance with claim 2, wherein m is equal to 8.

8. An apparatus in accordance with claim 2, wherein m is equal to 16.

9. An apparatus in accordance with claim 2, wherein the feed-forward recovery circuit includes a filter configured to attenuate noise present in the second data.

10. An apparatus in accordance with claim 9, wherein the filter is a low pass filter.

11. An apparatus in accordance with claim 2, wherein the second data has first quadrature and first in-phase components, the feed-forward carrier recovery circuit including:
first circuitry configured to generate third data in response to the second data, the third data being representative of a first phase angle;
second circuitry configured to generate fourth data in response to the third data, the fourth data having second quadrature and second in-phase components;
a filter circuit configured to filter the fourth data;
third circuitry configured to generate fifth data in response to the filtered fourth data, the fifth data being representative of a second phase angle; and
fourth circuitry configured to generate sixth data in response to the fifth data, the sixth data having third quadrature and third in-phase components.

12. An apparatus in accordance with claim 11, wherein the feed-forward carrier recovery circuit further includes a multiplier circuit that is configured to multiply the first data by the sixth data.

13. A method, comprising:
receiving a plurality of optical signals, each of which being modulated in accordance with an m-QAM modulation format, where m is an integer greater than 4;
supplying a plurality of outputs in response to the plurality of optical signals; and
supplying first data in response to the plurality of outputs, the first data having an associated first constellation, the first constellation including first points, each of which having a first magnitude relative to an origin and each of which having a corresponding one of a first plurality of phases relative to an axis, the first constellation also having second points, each of which having a second magnitude relative to the origin and a corresponding one of a second plurality of phases relative to the axis, each of the second plurality of phases being different than each of the first plurality of phases;
supplying second data in response to the first data, the second data having an associated second constellation, the second constellation including third points, each of which having the first magnitude relative to the origin and a corresponding one of the first plurality of phases relative to the axis, the second constellation including fourth points, each of which having the second magnitude relative to the origin and a corresponding one of the first plurality of phases; and
supplying a portion of the first data with a rotated phase relative to one of the second plurality of phases if the portion of the first data has an associated magnitude that is greater than the threshold magnitude.

14. A method in accordance with claim 13, wherein a difference between one of the first plurality of phases and a corresponding one of the second plurality of phases is predetermined.

15. A method in accordance with claim 13, wherein a difference between one of the first plurality of phases and a corresponding one of the second plurality of phases is π/4 radians.

16. An apparatus in accordance with claim 13, wherein a difference between one of the first plurality of phases and a corresponding one of the second plurality of phases is π/8 radians.

17. A method in accordance with claim 13, further including:
comparing the magnitude associated with the portion of the first data with the threshold magnitude, such that said supplying the portion of the first data is in response to the comparing.

18. A method in accordance with claim 13, wherein m is equal to 8.

19. A method in accordance with claim 13, wherein m is equal to 16.

20. A method in accordance with claim 13, attenuating noise present in the second data.

21. A method comprising:
receiving a plurality of optical signals, each of which being modulated in accordance with an m-QAM modulation format, where m is an integer greater than 4;
supplying a plurality of outputs in response to the plurality of optical signals; and
supplying first data in response to the plurality of outputs, the first data having an associated first constellation, the first constellation including first points, each of which having a first magnitude relative to an origin and each of which having a corresponding one of a first plurality of phases relative to an axis, the first constellation also having second points, each of which having a second magnitude relative to the origin and a corresponding one of a second plurality of phases relative to the axis, each of the second plurality of phases being different than each of the first plurality of phases;
supplying second data in response to the first data, the second data having an associated second constellation, the second constellation including third points, each of which having the first magnitude relative to the origin and a corresponding one of the first plurality of phases relative to the axis, the second constellation including fourth points, each of which having the second magnitude relative to the origin and a corresponding one of the first plurality of phases,
wherein the second data has first quadrature and first in-phase components, the method further including:
generating third data in response to the second data, the third data being representative of a first phase angle;
generating fourth data in response to the third data, the fourth data having second quadrature and second in-phase components;
filtering the fourth data;

generating fifth data in response to the filtered fourth data, the fifth data being representative of a second phase angle; and generating sixth data in response to the fifth data, the sixth data having third quadrature and third in-phase components.

22. A method in accordance with 21, further including multiplying the first data by the sixth data.

23. A system comprising:
a transmit node configured to supply optical signals, each of the optical signals being modulated in accordance with an m-QAM modulation format, where m is an integer greater than 4;
a receive node, including:
a plurality of photodiodes configured to receive the optical signals, the plurality of photodiodes supplying a plurality of outputs in response to the optical signals; and
a rotation circuit configured to receive first data, the first data being supplied to the rotation circuit in response to the plurality of outputs, the first data having an associated first constellation, the first constellation including first points, each of which having a first magnitude relative to an origin and each of which having a corresponding one of a first plurality of phases relative to an axis, the first constellation also having second points, each of which having a second magnitude relative to the origin and a corresponding one of a second plurality of phases relative to the axis, each of the second plurality of phases being different than each of the first plurality of phases, the rotation circuit being configured to supply second data having an associated second constellation, the second constellation including third points, each of which having the first magnitude relative to the origin and a corresponding one of the first plurality of phases relative to the axis, the second constellation including fourth points, each of which having the second magnitude relative to the origin and a corresponding one of the first plurality of phases; and
a feed-forward carrier recovery circuit, the rotation circuit being provided in the feed-forward carrier recovery circuit.

* * * * *